Sept. 20, 1971　　　　　　　W. BROWN　　　　　　　3,605,884
SINGLE GUIDELINE SYSTEM

Filed June 25, 1969　　　　　　　　　　　　　　　4 Sheets-Sheet 1

INVENTOR.
WALTER BROWN

BY Alan Rothenberg
ATTORNEY

INVENTOR.
WALTER BROWN

Sept. 20, 1971 W. BROWN 3,605,884
SINGLE GUIDELINE SYSTEM
Filed June 25, 1969 4 Sheets-Sheet 3

INVENTOR.
WALTER BROWN
BY
ATTORNEY

Sept. 20, 1971 W. BROWN 3,605,884
SINGLE GUIDELINE SYSTEM
Filed June 25, 1969 4 Sheets-Sheet 4

INVENTOR.
WALTER BROWN

BY *Alleen Rothenberg*

ATTORNEY

United States Patent Office 3,605,884
Patented Sept. 20, 1971

3,605,884
SINGLE GUIDELINE SYSTEM
Walter Brown, Long Beach, Calif., assignor to
North American Rockwell Corporation
Filed June 25, 1969, Ser. No. 836,372
Int. Cl. E21b *33/035*
U.S. Cl. 166—.5
12 Claims

ABSTRACT OF THE DISCLOSURE

The disclosed system for emplacing equipment under water employs the combination of an orienting bushing mounted on a guide sleeve that is adapted to travel down a flexible guideline and which cooperates with a guide key mounted on a guide pin that is fixedly positioned to one side of a connector on a subaqueous bottom mounted structure. The relatively coarse adjustment provided by the orienting bushing enables the use of a fine adjustment that is achieved by a radial cylindrical extension fitting into an upwardly tapered slot that is fixedly positioned on the bottom structure at a known orientation relative to the bottom connector and to the bottom guide pin. As structure to be connected at the bottom is lowered into position the orienting bushing operates first to produce a coarse orientation which then allows mating of the radial extension and tapered slot to provide a fine adjustment of the equipment that is to be emplaced.

BACKGROUND OF THE INVENTION

As underwater wells are drilled and operated to produce fluids in deeper water more and more of the operating equipment is placed upon the bottom. Such equipment, because of relative difficulty of access, becomes ever more self-sufficient and inherently more complex. Emplacement and assembly of equipment accordingly entails greater efforts and problems related to assembly are of increasing significance. Among the most successful proposals for carrying out drilling and producing operations from surface facilities is the use of subsurface structures positioned on the subaqueous bottom and the connection of such structures to the floating facility by one or more guidelines that enable emplacement of the necessary tools and equipment to and from the floating facility. It is common to employ two or more of such guidelines and to secure equipment to be emplaced to several of these during its transport to the subsurface structure in order to maintain position and orientation. However, when operations are required in deep water, on the order of 1,000 to 2,000 feet depth or more, severe problems are encountered with regard to the fouling of plural guidelines. In water depths of several thousand feet or more flexible guideline cables, and even drill string that may be employed as guidelines, will experience such large excursions that entanglement of closely adjacent lines is a major problem.

This problem of plural guidelines in deep water is recognized in the patent to Bower et al. for Underwater Drilling Guide, No. 2,984,308, which teaches use of a single guideline extending from the bottom to the surface facility and formed with a key that extends for the full length of the guideline. A slidable assembly, slidable on the guideline, has a keyway mating with the key and is arranged to carry members and equipment adapted to be emplaced on the bottom of the body of water. In addition, registering means in the form of a tapered slot and pin are provided adjacent the guideline for effecting registration or orientation of the equipment just before it is emplaced on the bottom. Operation of the single guideline system of Bower et al. is wholly dependent upon maintaining at least a preliminary or a coarse orientation of the slidable assembly on the guideline. In this arrangement it is essential to maintain coarse orientation of the guideline itself during the major portion of the traverse of the slidable assembly from the surface toward the bottom. It will be readily appreciated that if such coarse orientation is not maintained, the pin on the registering means may not be positioned so as to even enter the tapered slot that is located on the bottom adjacent the guide means. In an attempt to solve this problem of coarse orientation, the patentees have provided the key and keyway extending the full length of the guideline; nevertheless, this arrangement, although it will limit relative rotation of the guideline and the assembly slidably guided thereon, will in no way eliminate or minimize the torsional displacement of the guideline itself. For a guideline having a length of 1,000 to 2,000 feet or more, even twelve inch diameter pipe will be subject to large torsional displacements. Accordingly it will be apparent that if forces acting upon the slidable guide member and equipment carried thereby during the descent should have any significant horizontal components, severe twisting of the entire assembly, including the guideline itself, that is being lowered may take place and there may be no possibility of achieving the registration of the two auxiliary orienting elements, the pin and slot. Furthermore, such twisting will tend to lock the key within the keyway and thus prevent further descent.

With an arrangement such as shown by the patentees Bower et al., should there occur a vertical force acting upon the equipment carried by the sliding guide member which is radially displaced from the axis of the guideline, there will be a torsional force exerted upon the sliding guide member tending to rotate it about an axis normal to the axis of the guide member and thus cause the slidable member to be locked upon its guide.

Still another difficulty with the system of Bower arises from the fact that drill pipe normally comes in lengths about forty feet which are screwed together as the pipe is lowered. Considerable difficulty would arise in attempts to screw-connect two adjacent pieces of pipe keyed as suggested by Bower because it is necessary to maintain alignment of the keys on these two sections. Drill pipe, as is well known, requires a specialized surface facility, a drilling rig, for its emplacement. It is preferable to enable emplacement of equipment with a variety of different types of surface facilities.

BRIEF SUMMARY OF THE INVENTION

In carrying out the principles of this invention in accordance with a preferred embodiment thereof, alignment apparatus is provided wherein first and second movable members are fixedly secured to each other and arranged to move in unison toward and into engagement with a pair of fixed members. As the members move toward engagement, one of the movable members cooperates with one of the relatively fixed members to achieve a coarse orientation of the members relative to each other. After the coarse orientation has been achieved the other members cooperate to achieve a fine orientation. In one embodiment the member that is to be connected and oriented is carried by the movable members in such a manner that it can experience a limited amount of rotation about an axis substantially normal to the direction of the movement of the members toward each other.

A preferred embodiment of the invention includes an arrangement wherein a guide element that extends from a subsurface structure to a surface facility, a movable member that is slidably mounted on the guide element, and a guide member fixedly mounted to a bottom structure area, all are coaxial with each other and the two members are provided with mutually cooperating means that operate as the movable member moves to a lower position to achieve a coarse orientation of the movable member with respect to the fixed member about an axis that is substantially vertical.

Objects and many attendant advantages of the invention will become apparent from the following description when taken in connection with the accompanying drawings in which.

Throughout the drawings like reference numerals refer to like parts.

The embodiment of the invention to be described herein is specifically adapted for application to well satellite assemblies of the type more particularly described in a copending application of W. Brown et al. for Deep Water Operating and Servicing System for Operating and Servicing Marine Wells, Ser. No. 717,761, filed Apr. 1, 1968. Such a system is most economically feasible in production of hydrocarbons at depths of 1500 feet or more. For lesser depths it is possible to employ plural guidelines with less danger of guideline entanglement although, as will be readily appreciated, the invention to be described herein may be employed in considerably shallower waters despite the fact that it will find its optimum benefit through use in exceedingly deep water operations.

The arrangement to be described herein is applicable to a configuration wherein a single well head is connected by a tubing loop to one connector on a centrally located satellite or it may be employed where two of the wells surrounding the central satellite are connected to the single satellite connector as more particularly described in a copending application for Coupling Apparatus for Coupling Underwater Operating and Servicing Module to Plurality of Underwater Wells, Ser. No. 722,001, filed by W. Brown, on Apr. 17, 1968.

Figure 1:
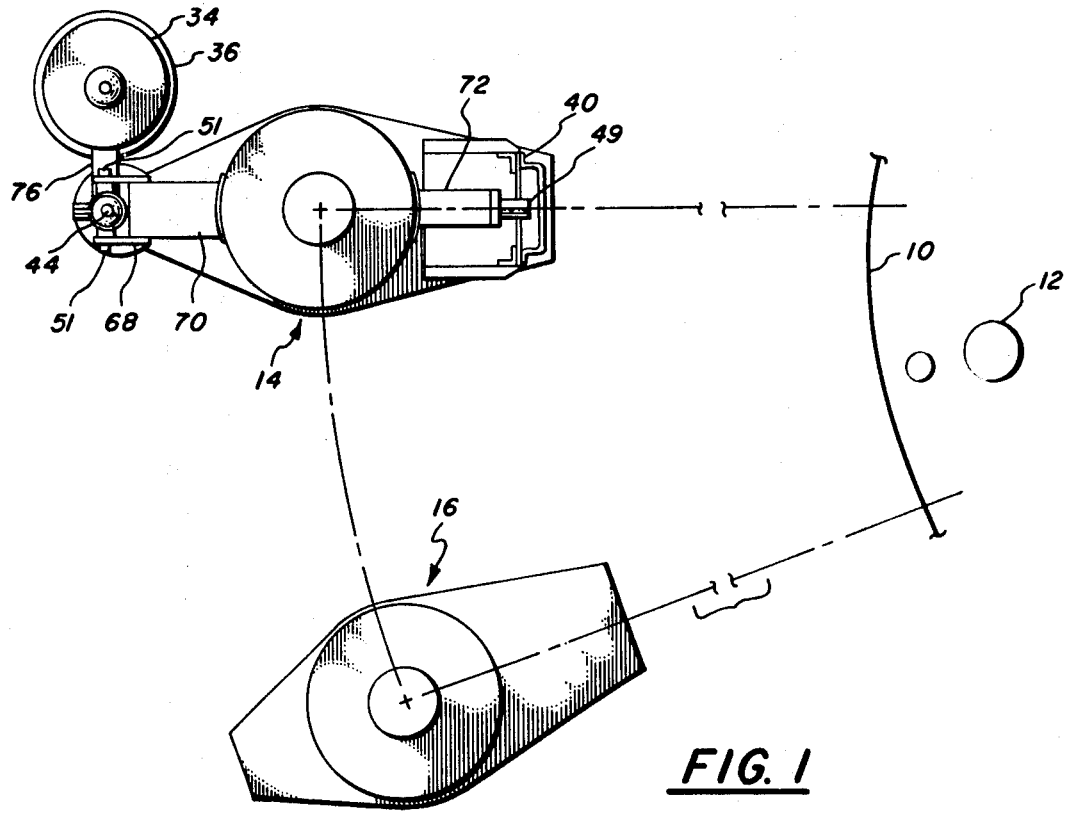
FIG. 1 is a top view of a single guideline system arranged for use with a satellite plural well head production system.

As described in the aforesaid copending application, Ser. No. 722,001, and as illustrated in FIG. 1 herein, a centrally located satellite 10 will have a plurality of connectors each of which is to be connected to one or two of corresponding connectors of the group of surrounding well heads. In the arrangement illustrated in FIG. 1 a satellite connector 12 is arranged to be connected to both of the connectors 14 and 16 of the group of surrounding well heads which may be as many as eighteen in number. The connecting structure is described in detail in the aforesaid copending application Ser. No. 722,001.

Figure 2:
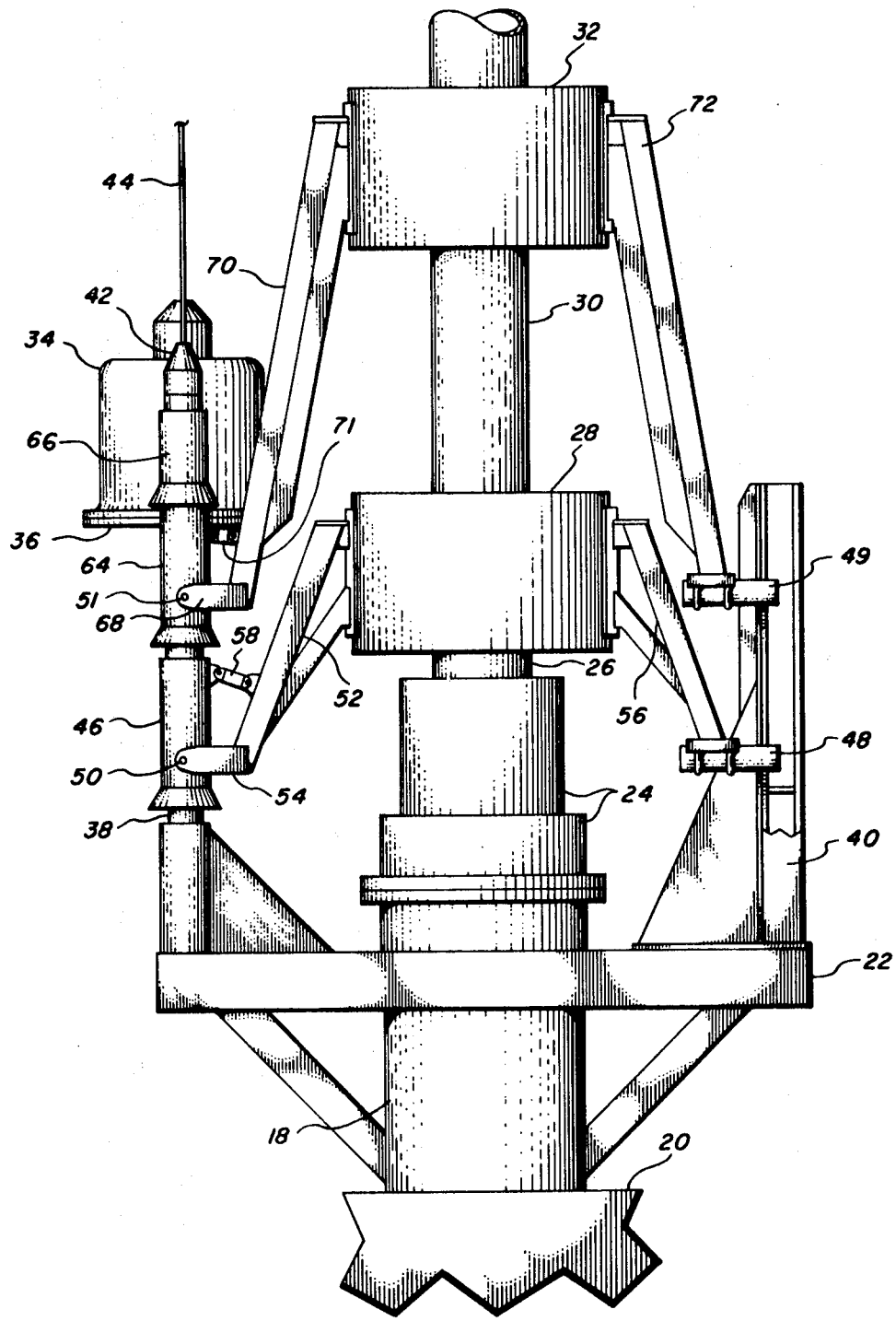
FIG. 2 is an elevation view of the single guideline system connected to a Christmas tree of a single well head.

As illustrated in FIG. 2 each well head comprises a production tree of which a part is shown in this figure and comprising in detail a casing 18 that extends through a fixed base or support 20 mounted on the subaqueous bottom and supporting a guide frame 22 which carries a casing head 24. The casing head 24 extends upwardly into a stringer 26 that fits into a lower collet connector 28. Lower collet connector 28 carries a solid block valve assembly 30 with a stinger that extends into an upper collet connector 32. The upper portion of the production tree and the tubing loop assembly (not shown) that connects the production well to the satellite structure are secured to the connector 32.

A hydraulic control pod assembly 34, 36 (FIGS. 1 and 2) is carried by portions of the movable guide sleeves, which remain in place, as will be more particularly described below.

In the guideline system illustrated the parts to be emplaced and connected are already in position as illustrated in FIG. 2. These parts comprise first, the lower collet connector 32, second, the upper collet connector 28, and third, the hydraulic pod assembly 34, 36. As the several parts of the production tree are brought from a facility at the surface down to and mated with the immediately lower parts of the tree, it is necessary that these parts be carefully aligned to achieve a relative orientation about the substantially vertical axis of the production tree that has relatively close angular tolerances. The angular tolerances required by the configuration of the various connecting devices, details of which are well known and form no part of this invention, together with the large size of the parts impose severe restraints upon the orientation requirements of the guideline system. It may be noted that in a system such as that illustrated in FIGS. 1 and 2, the collet connectors may be on the order of three to four feet in diameter and the center-line of the connectors are displaced about four feet from the centerline of the guide pins, to be more particularly described below, to provide the necessary operating clearances.

To achieve this precision of relative orientation is difficult if not impossible with a single orientation device. This is particularly true in a system where a guideline may be on the order of 2,000 feet or more in length and thus subject to considerable bending and twisting, and where the various elements to be assembled may experience considerable angular motion about different axes during descent to the bottom structure. No previously known arrangements are capable of providing the required degree of precision while accepting the maximum possible initial misorientation of the parts. A camming arrangement coaxial with the guideline itself will accept the maximum relative misorientation. However, since it is located on the axis of the guideline, its positioning forces are minimized. On the other hand, a set of mutually cooperating cam surfaces displaced from the axis of the guideline will exert considerably greater orienting forces because of the distance from the center of rotation. However, the greater this distance, the greater is the amount of linear displacement due to a given amount of angular misorientation. Accordingly, with any significant amount of angular misorientation, the linear displacement between the parts to be mated at a distance from the axis of rotation may become greater than is physically possible or convenient to handle.

To employ the advantages of both coaxial camming arrangement and camming arrangement radially displaced from the axis of rotation, there is provided a pair of relatively fixed members, rigidly secured to the base, comprising a guide pin 38 and a slot plate 40. The guide pin 38 terminates in an upper plug-in end 42 to which is fixedly secured a flexible cable or guideline 44. The guideline 44 extends upwardly to a connection with a surface facility. For cooperatively engaging and achieving relative orientation with respect to the fixed member 38 and 40, there are provided a pair of relatively movable members in the form of a guide sleeve 46 and a radial guide cylinder 48 which may be secured to each other for movement in unison in any suitable fashion.

As illustrated in FIG. 2, the two relatively movable members 46 and 48 are connected to each other by means of their connection to the lower collet connector 28 with all three of these elements being aligned with each other. It will be readily appreciated that other arrangements may be employed wherein, for example, the guide sleeve 46 may be directly and fixedly connected to the guide cylinder 48 with the lower collet connector mounted as may be deemed suitable on one or both of these members with a known and fixedly constrained angular horizontal orientation relative to these members.

In the arrangement shown the lower collet connector is mounted for limited motion with respect to the guide member 46 about the axis of a pair of trunnions 50. Trunnions 50 carry a fixed arm 52 by means of a fork 54 with the collet 28 fixedly secured to the arm 52. A second arm 56 is fixedly connected to the collet 28 and at its lower end fixed to the radial guide cylinder 48.

In order to limit motion of the collet 28 about the trunnions 50 and at the same time to maintain the collet in a nominal vertical orientation with respect to the guide sleeve 46, a bungee 58 is pivoted at its opposite ends to the sleeve 46 and to the arm 52 to resiliently urge the collet relative to the sleeve 46 to the position illustrated while allowing for some misalignment during the emplacement and engagement of the collet with the stringer 26.

Figure 3:
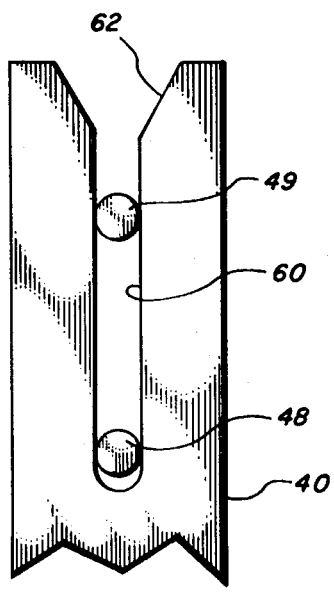
FIG. 3 is a side view of the slot plate.

The slot plate bracket 40 has a slot 60 (FIG. 3) formed therein of sufficient depth to receive and guide several radial guide cylinders. The slot has an upwardly tapered opening 62 which operates in cooperation with the guide cylinder 48 to provide a camming arrangement that achieves the fine orientation of the equipment that is to be emplaced. The maximum width of opening 62, in a preferred embodiment, is about ten inches whereby the coarse orientation that need be effected by the coaxial camming arrangement on the guideline 44, more particularly described below, may allow a transverse linear displacement at the slot plate of nearly five inches in either direction.

Independent of but resting upon the guide sleeve 46 is a second guide sleeve 64 identical to the guide sleeve 46. Resting upon the second sleeve is a third guide sleeve 66 substantially identical to the lower two guide sleeves. Guide sleeve 64 carries a pair of trunnions 51 that pivotally mount a fork 68 and arm 70 that is fixedly attached to the upper collet connector 32. Arm 70 is urged to its selected position about the axis of the trunnions 51 by a bungee 71. Also attached to this connector is a second arm 72 to which is secured a second radial guide cylinder 49 that is adapted to enter into the slot 60 of slot plate 40.

In the illustrated production tree the arrangement is such that guide sleeve 64 also carries a fixed arm 74 (FIG. 4) that fixedly mounts the lower portion 36 of the hydraulic control pod. The uppermost of the three guide sleeves, guide sleeve 66, mounts an arm 76 which fixedly carries the upper portion 34 of the hydraulic control pod.

Figure 5:
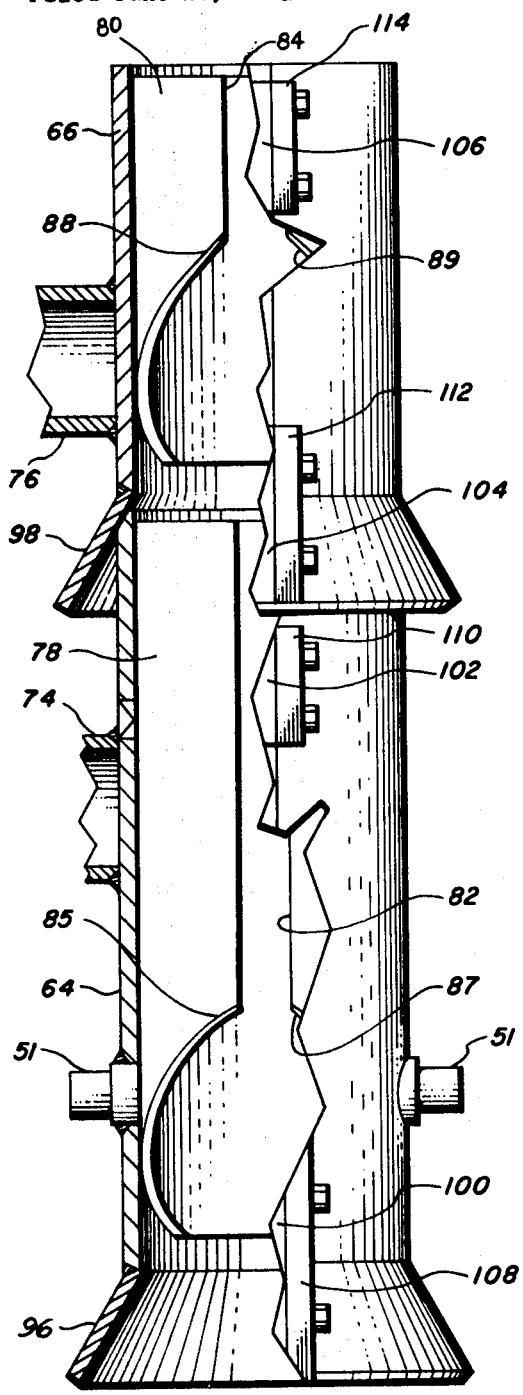
FIG. 5 is an elevation partly in cross-section of two of the guide sleeves and orienting bushings.
Figure 7:
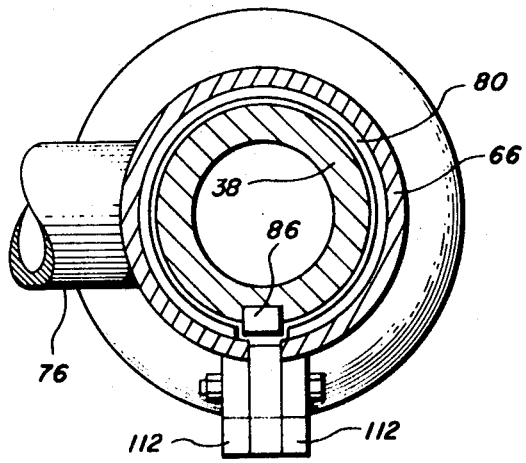
FIG. 7 is a cross-section of the structure of FIG. 5 and the guide pin.
Figure 6:
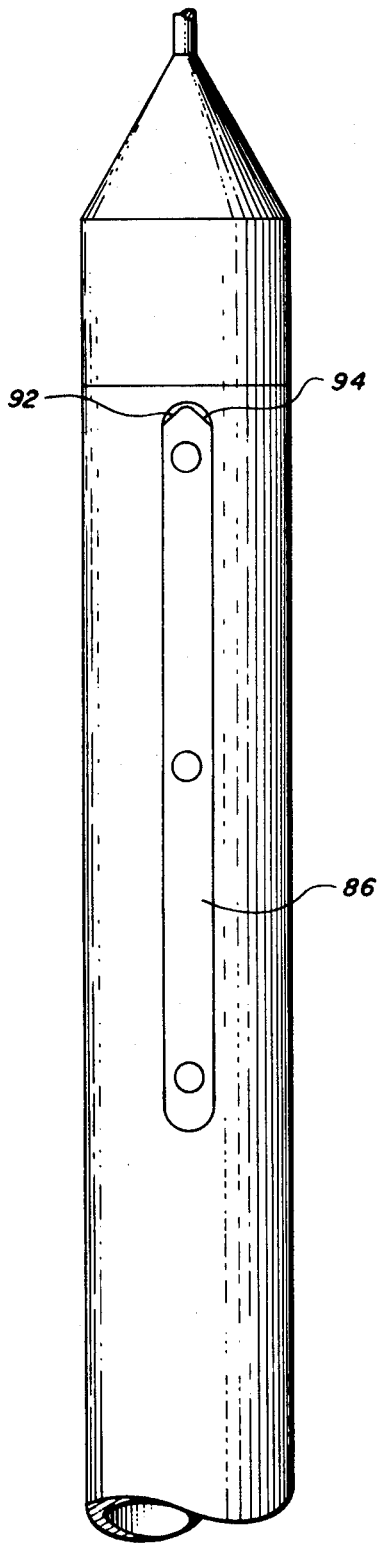
FIG. 6 is an elevational view of a guide pin.

As illustrated in FIGS. 5, 6, and 7, each of the guide sleeves has fixedly secured thereto on its inner surface an orienting bushing of which only two, 78, 80 are shown. The orienting bushings, 78, 80, are formed with longitudinally extending key slots 82, 84 that are adapted to fit loosely over a key 86 that is formed on the guide pin 38. Each of the orienting bushings 78 and 80 has a 45° cut in the lower end thereof extending downwardly from the key slot thereof to the bottom of the bushing. This cut, accordingly, provides a pair of helix cam faces 85, 87, and 88, 89 which are arranged to match cammed edges 92, 94 formed on the upper end of key 86, (FIG. 6). Each of the guide sleeves is formed with a downwardly flaring lower skirt or flange 96, 98 which rests upon the beveled upper edge of the immediately lower guide sleeve when the assembly has been accomplished. Each guide sleeve is also formed with a longitudinally extending cutout or slot that allows sideward insertion of the guideline at the surface facility. After insertion of the guideline through the slots into the guide sleeve these slots are closed by bolting spacer bars 100, 102, and 104, 106 to fixed flange members 108, 110, 112, and 114 as illustrated in FIGS. 5 and 7.

Figure 4:
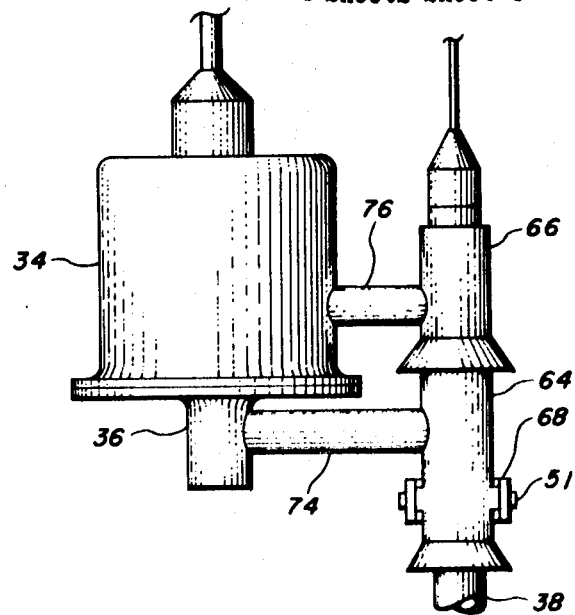
FIG. 4 is an elevation view of part of the structure of FIG. 2.

The lowermost of the guide sleeves, sleeve 46 which is not illustrated in FIG. 4, is substantially identical to the guide sleeve 64 and includes its own slot, flanges and bolted spacers, together with its slotted orienting bushing and trunnions 50 for carrying the fork 54.

Figure 8:
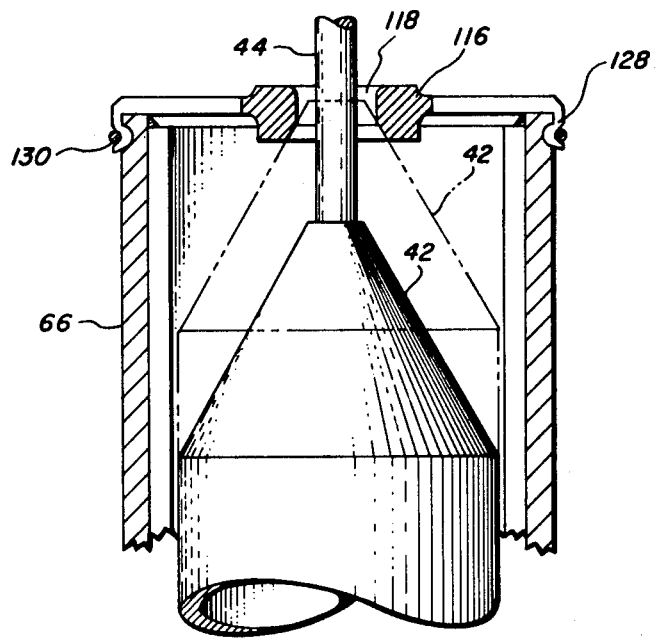
FIG. 8 illustrates an arrangement at the top of the guide sleeve for centering the guideline.
Figure 9:
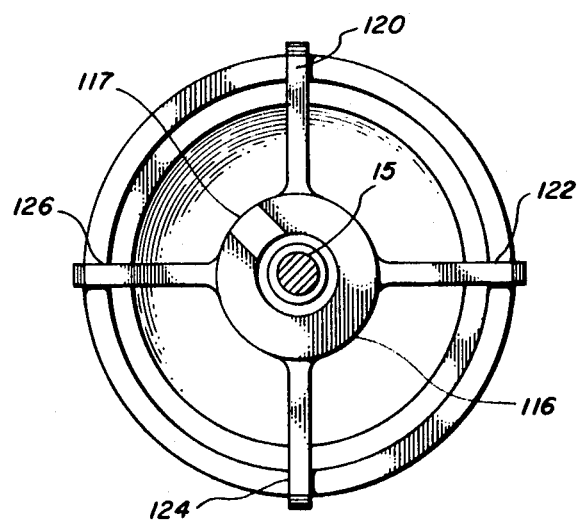
FIG. 9 is a top view of the structure of FIG. 8.

To prevent the edges of the key slot 82, 84 and the helical cam faces 85, 87, 88, 89 of the guide sleeves from cutting the guidelines, each guide sleeve may be equipped with a centering device shown in detail in FIGS. 8 and 9.

This device includes a centering hub 116 having an aperture 118 with rounded edges for receiving the guideline 44. The hub 116, having a detachable closure portion 117, carries a plurality of arms 120, 122, 124, and 126 which extend over the top of the guide sleeve 66 and include downwardly extending fingers such as 128 that snap into a groove formed in the upper end of the guide sleeve and which are locked in place by a lock wire 130. The centering device is made of frangible material whereby it is readily broken by the upper end of the guide pin 42 as the sleeve is moved down to its lowermost position.

In operation of the single guideline assembly system described herein, the various parts to be assembled to the bottom structure are collected at the surface facility and the relatively movable members together with the equipment such as the collet or hydraulic control pod connected thereto are emplaced on the guideline individually. Thus where the production tree on the bottom has been completed to include the casing head 24 and stringer 26, the first movable assembly, including the guide sleeve 46, lower collet connector 28 carried thereby together with the guide cylinder 48, are positioned on the guideline 44 at the surface, the spacers are bolted in place, the centering device of FIGS. 8 and 9 is emplaced over the guide sleeve and over the guideline and the closure hub portion 117 of the hub 116 is attached. The entire assembly then is lowered along the guideline under control of a hoist with adequate brakes or a conventional drilling rig until the guide sleeve approaches the upper end of the plug-in 42 of the guide pin 38. The guide pin is received in the sleeve and the upper end of the plug-in 42 breaks the centering device, which is no longer needed.

As can be best seen in FIG. 2, the upper end of guide pin 38 is higher than the upper end of the slotted plate 40 whereby the cooperative orienting camming action of the bushing and the key in the guide pin will occur first, to produce a coarse orientation that ensures registry of the fine adjustment guide cylinder with the tapered opening 62 of the slotted plate 40. Thus, as the assembly approaches the bottom, the helix surface such as 85, 87 or the corresponding helical surfaces of guide sleeve 46 will first engage surfaces 92, 94 of the key 86. As can be seen in FIG. 5 the 45° cut in the orienting bushing 78 and 80 is such that the helical camming face extends on either side for considerably more than 90°. In an actual preferred embodiment the orienting bushing will be cut to enable a maximum misorientation of about 130° in either direction of azimuth rotation. As the key is received in the key slot the movable guide sleeve and movable assembly continues to descend until the radial guide cylinder engages the cam face 62 of the slot plate to complete the orientation. This fine orientation adjustment about the axis of the guideline is permitted, or required, at least in part by the tolerances built into the coarse orientation members. Upon further descent the equipment to be emplaced, collet connector 28 in this instance, mates with the stringer 26 and the connection is then completed. If, during this mating and connecting of the collet connector with the stringer, forces should be exerted upon the collet connector that tend to reorient the connector with respect to the guide pin 38, such relative motion to a limited degree is permitted to take place about the axis of trunnions 50 under the recentering urging of the bungee, 58. In the illustrated arrangement, relative motion of the connector 28 and guide sleeve 46 about the axis of trunnions 50 occurs about this axis which is normal to the guide pin axis and also normal to the line between the center of the connector and the center of the guide pin. It will be readily appreciated, however, that misorientation of the connector relative to the guide pin may also occur about an axis extending between the centerline of the guide pin and the centerline of the connector. If deemed necessary or desirable a similar pivoting and bungee arrangement may be employed, either instead of or together with, the limited pivotal arrangement illustrated in the drawings. Thus, where deemed necessary or desirable, relative rotation of connector and the guide sleeve 46 about two mutually angulated axes rather than just the one illustrated may be employed.

Before the connector has actually reached its position adjacent the stringer 26 but after the completion of the rough orientation provided by the orienting bushing and key slot, the radial guide cylinder has been positioned angularly by the coarse orientation within the lateral extent, which may be about ten inches as previously described, of the upper portion of the tapered slot in slot plate 40. Thus upon further descent of the assembly, the coarse orientation has assured that the guide cylinder will engage the slot in plate 40 and thereby provide the fine adjustment of angular orientation of the assembly which then proceeds to complete its downward motion to achieve the final engagement of collet connector and stringer.

The assembly procedure described in connection with guide sleeve 46, guide cylinder 48, and connector 28 is then repeated with guide sleeve 64, centering device, connector 32, and lower part of hydraulic control pod 36 and guide cylinder 49. This assembly too is emplaced upon the guideline 44 at the surface facility. The assembly is lowered, the coarse orientation occurs as the helical surface of the bushing engages the upper portion of the key to ensure that the guide cylinder 49 is captured by the upwardly tapered slot 60, 62 which then achieves the fine adjustment. As the upper portion of the guide sleeves 46, 64 are lowered toward the top of the guide pin 38, the plug-in portion 42 engages the hub 116 of the frangible centering device to break this device which then becomes displaced from the guide sleeve to enable the succeeding or next upper guide sleeve to rest upon the lower guide sleeve as illustrated in FIG. 4.

After the second of the two collet connectors is lowered and emplaced, the third guide sleeve 66 is fitted to the guideline 44 together with the upper part 34 of the hydraulic control pod carried thereby. These are then lowered along the guideline until the one or both of helical orienting surfaces 88, 89 engages the upper camming surfaces of the key 86 to achieve the desired orientation of the upper part of the control pod. In the particular arrangement of equipment illustrated in the drawings (FIG. 1), the distance of the control pod from the centerline of the guide pin is considerably less than the distance of the centerline of the connector from the guide pin. Because of this shorter distance to the centerline of the control pod, actual linear lateral displacement due to a given amount of angular misorientation about the axis of the guide pin is considerably less. Accordingly the coarse angular adjustment achieved by the orienting bushing is considered to be sufficient to effect the desired precision of alignment of the two control pods.

Th particular assembly procedure will, of course, depend upon the stage of well completion and the nature of the operations that are to be performed. Normally, after drilling has been completed, the well will be plugged by procedures well known to those skilled in the art and then the drilling Christmas tree structure will be removed. At this time the first valving assembly, such as the lower collet connector 28, will be lowered as described herein to enable controlled valving or sealing of the well. When this has been accomplished the well plug is removed and subsequent assembly, including the collet connector 32 and the hydraulic control pods, may be completed.

There has been described a novel single guideline emplacement system employing the combination of an orienting bushing including a guide pin with key, a guide sleeve with an internal orienting bushing having a key slot and helical camming face on each side thereof, together with a guide pin located to one side of a connector. There is also provided a fine adjustment comprising a radial guide cylinder fitting into a tapered slot plate on the other side of the connector, all arranged so that in the course of lowering the assembly the orienting bushing will operate first to produce a rough orientation which then enables the fine adjustment or final orientation to be achieved by the radial guide cylinder and slot plate. The described arrangement is of unique value with large dimension wherein the guide must be located at a large distance from the connector centerline because of the size of the connector. In addition for operation in muddy water or water with significant amounts of debris, clearance between pin and bushing and between key and keyway must be kept large whereby additional connector misalignment may occur. The described arrangement also makes provision for allowing relative motion of the connector and the guide arrangement while at the same time holding approximate vertical position of the guide sleeves and connector by bungee, thus affording an additional feature to overcome still another problem due largely to the large distance between guide sleeve and load centerline.

What is claimed is:

1. Alignment apparatus comprising:
   first, second, and third relatively fixed members;
   first, second, and third movable members fixedly secured to each other and adapted to move in unison from a first position remote from the fixed members toward and into a second position in engagement with respective ones of said fixed members;
   said first members having mutually cooperating means for causing a coarse orientation of said movable members relative to the fixed members;
   said second members having mutually cooperation means for causing a fine orientation of said movable members relative to the fixed members;
   said cooperating means of said second members being displaced relative to the cooperating means of said first members along the direction of said movement toward each other, so that the cooperating means of said first members makes the coarse orientation before said fine orientation is made by said second members; and
   said third members having mutually cooperation means which make engagement after said fine orientation has been made.

2. Alignment apparatus comprising:
   first and second relatively fixed members;
   first and second movable members fixedly secured to each other and adapted to move in unison from a first position remote from the fixed members toward and into a second position in engagement with said fixed members;
   said first members having mutually cooperating means for causing a coarse orientation of said movable members relative to the fixed members;
   said second members having mutually cooperating means for causing a fine orientation of said movable members relative to the fixed members;
   means for connecting a member to be oriented to at least one of said relatively movable members;
   said cooperating means of said second members being displaced relative to the cooperating means of said first members along the direction of said movement toward each other, whereby the cooperating means of said first members cause said coarse orientation before said fine orientation is caused; and
   said last mentioned means including means for mounting said member to be oriented for pivotal motion relative to said one movable member about an axis that is substantially angulated with respect to the direction of said movement of the members toward each other.

3. Apparatus for guiding equipment from a facility near the surface of a body of water to a selected point on a structure fixed far below said surface comprising:

a member fixed to said structure;

a guide element connected to the structure and extending to said facility;

a movable member slidably mounted on the guide line for movement between an upper position and a lower position;

said members having mutually cooperating means operable as the movable member moves to said lower position for orienting said movable member with respect to said fixed member about a substantially vertical axis; and said fixed member comprising an upstanding pin and said movable member including a sleeve adapted to receive the pin, said sleeve including a frangible guide element centering means comprising a hub having an aperture receiving the guide element and means for fixedly connecting the hub to the upper end of the sleeve, whereby when the movable member moves to said lower position the centering means is broken by engagement with the pin to permit the sleeve to further receive the pin.

4. The apparatus of claim 3 wherein said movable member is mounted on the guideline for rotation about the guideline.

5. The apparatus of claim 3 wherein said upstanding pin extends from said structure for a distance exceedingly small compared with the extent of said guide element, said guide element having the lower end thereof secured to the upper end of the guide pin; and said cooperating means comprises a key on the guide pin and a slotted cam on the movable member.

6. The apparatus of claim 3 including:

a second member fixed to said structure;

a second movable member fixed to the first mentioned movable member; and said second members having mutually cooperating means operably after said first members are oriented for further orienting said movable members.

7. The apparatus of claim 6 wherein said second fixed member extends from said structure for a lesser distance than said guide pin.

8. The apparatus of claim 3 wherein:

said members and guide element are all coaxial, and said cooperating means comprises:

a key on one of the members having a pair of cam surfaces extending toward opposite sides of the key at an end thereof facing toward the other member; and an orienting element on the other of the members having a slot for receiving said key and a pair of cam follower surfaces extending from opposite sides of the slot at an end thereof facing toward said one member.

9. Apparatus for guiding equipment from a facility near the surface of a body of water to a selected point on a structure fixed far below said surface comprising:

a member fixed to said structure;

a guide element connected to the structure and extending to said facility;

a movable member slidably mounted on the guideline for movement between an upper position and a lower position;

said members having mutually cooperating means operable as the movable member moves to said lower position for orienting said movable member with respect to said fixed member about a substantially vertical axis;

said members and guide element being all coaxial, and said cooperating means comprises:

a key on one of the members having a pair of cam surfaces extending toward opposite sides of the key at an end thereof facing toward the other member; and an orienting element on the other of the members having a slot for receiving said key and a pair of cam follower surfaces extending from opposite sides of the slot at the end thereof facing toward said one member;

a slotted plate fixed to said structure at a predetermined distance from said fixed member;

a device to be guided fixed to the movable assembly;

a second movable member fixed to said device at a distance from said first movable member equal to said predetermined distance, said second movable member comprising a radial guide for engaging the slot in said slotted plate when said first movable member moves to said lower position.

10. Apparatus for guiding an aligning equipment to be carried from a facility at the surface of a body of water to a structure including a bottom connector on the bottom of the body of water comprising:

a guide frame affixed to the bottom structure and extending on either side of the bottom connector;

a guide pin affixed to and upstanding from the guide frame on one side of the bottom connector;

said guide pin having a longitudinally extending key protruding from an outer surface thereof;

a guideline connected to the upper end of the guide pin and to the facility at the surface of the body of water;

an upstanding slot plate affixed to the guide frame on a side thereof opposite the guide pin, said slot plate having an upwardly extending slot with an upwardly tapering opening at the upper end thereof;

a guide sleeve slidably mounted on the guideline and having an orienting bushing fixedly secured thereto and internally thereof;

said orienting bushing having a longitudinally extending keyway and a pair of helical cam surfaces extending outwardly and downwardly from opposite sides of the keyway;

a movable connector adapted to mate with the bottom connector and carried by the guide sleeve;

a radial guide cylinder carried by the movable connector on the side thereof opposite the guide sleeve, whereby as the assembly of guide sleeve, movable connector and radial guide cylinder are moved along the guideline downwardly toward the bottom, camming and orienting engagement occurs between the helical cam surface of the orienting bushing and the upper end of the guide pin key and between the radial guide cylinder and the upper end of the slot plate to ensure alignment of the movable connector with the bottom connector;

the upper end of the guide pin extending above the upper end of the slot plate whereby upon lowering of the guide sleeve, movable connector and radial guide cylinder toward the bottom, the orienting bushing will engage the guide key to achieve rough orientation and, subsequently, the radial guide cylinder will engage the upwardly tapering opening of the guide slot to achieve a fine orientation of the movable connector with respect to the bottom connector;

the movable connector being carried by the guide sleeve for relative motion about at least one of a pair of mutually angulated axes, each of which is substantially angulated with respect to the axis of the guide sleeve; and means for restraining relative motion of said connector and sleeve about said one axis while urging the connector to assume a selected position about said one axis with respect to the axis of the guide sleeve.

11. The apparatus set forth in claim 10 wherein the connection between the movable connector and the guide sleeve comprises:

a pair of trunnions mounted on the guide sleeve;

a fork pivotally mounted on the trunnions;

an arm rigidly connected to and between the connector and the fork; and a bungee pivotally connected to and between the guide sleeve and the arm.

12. An underwater guiding system comprising:
a guide pin fixed to a bottom structure and upstanding therefrom;
a guideline having a diameter considerably less than the diameter of the pin fixed to and between the upper end of the pin and a floating facility;
a guide sleeve mounted on the guideline for movement from an upper position near the floating facility to a lower position in which the pin is received in and extends through the sleeve; and
guideline centering means on the sleeve comprising:
a hub having an aperture receiving the guideline and a plurality of arms fixedly connecting the hub to the upper end of the sleeve, at least one of said hubs and said arms being frangible, whereby the centering means is broken as the sleeve moves to said lower position and the pin extends therethrough into engagement with the hub.

References Cited

UNITED STATES PATENTS

| | | | |
|---|---|---|---|
| 2,984,308 | 5/1961 | Bauer et al. | 175—7 |
| 3,050,140 | 8/1962 | Hayes | 166—.6 |
| 3,062,287 | 11/1962 | Hayes | 166—.5 |
| 3,215,202 | 11/1965 | Pollard et al. | 166—.5 |
| 3,302,709 | 7/1967 | Postlewaite | 166—.5 |
| 3,503,442 | 3/1970 | Dodd et al. | 166—.5 |

JAMES A. LEPPINK, Primary Examiner

U.S. Cl. X.R.

175—7